United States Patent
Lv et al.

(10) Patent No.: US 11,593,268 B2
(45) Date of Patent: Feb. 28, 2023

(54) METHOD, ELECTRONIC DEVICE AND COMPUTER PROGRAM PRODUCT FOR MANAGING CACHE

(71) Applicant: EMC IP Holding Company LLC, Hopkinton, MA (US)

(72) Inventors: Shuo Lv, Beijing (CN); Ming Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 17/079,925

(22) Filed: Oct. 26, 2020

(65) Prior Publication Data
US 2021/0286730 A1  Sep. 16, 2021

(30) Foreign Application Priority Data
Mar. 12, 2020 (CN) .......................... 202010170543.3

(51) Int. Cl.
*G06F 12/00* (2006.01)
*G06F 12/0877* (2016.01)

(52) U.S. Cl.
CPC ...... *G06F 12/0877* (2013.01); *G06F 2212/60* (2013.01)

(58) Field of Classification Search
CPC .......................... G06F 2212/60; G06F 12/0877
See application file for complete search history.

(56) References Cited

U.S. PATENT DOCUMENTS

| 9,201,804 | B1 * | 12/2015 | Egyed | G06F 12/0871 |
| 10,691,613 | B1 | 6/2020 | Tong et al. | |
| 11,074,196 | B1 * | 7/2021 | Aleti | G06F 12/0866 |
| 2005/0262306 | A1 * | 11/2005 | Nenov | G06F 12/128 |
| | | | | 711/170 |
| 2006/0143396 | A1 * | 6/2006 | Cabot | G06F 12/121 |
| | | | | 711/134 |
| 2006/0212654 | A1 * | 9/2006 | Balakrishnan | G06F 12/0862 |
| | | | | 711/134 |
| 2014/0089559 | A1 * | 3/2014 | Cai | G06F 12/127 |
| | | | | 711/E12.07 |

(Continued)

OTHER PUBLICATIONS https://en.wikipedia.org/wiki/Cache_replacement_policies This page was last edited on Feb. 12, 2020, at 22:15 (UTC). (Year: 2020).*

*Primary Examiner* — Shawn X Gu
*Assistant Examiner* — Mohammad S Hasan
(74) *Attorney, Agent, or Firm* — BainwoodHuang

(57) ABSTRACT

Techniques for cache management involve accessing, when a first data block to be accessed is missing in a first cache, the first data block from a storage device storing the first data block; selecting, when the first cache is full and based on a plurality of parameters associated with a plurality of eviction policies, an eviction policy for evicting a data block in the first cache from the plurality of eviction policies, the plurality of parameters indicating corresponding possibilities that the plurality of eviction policies are selected; evicting a second data block in the first cache to a second cache based on the selected eviction policy, the second cache being configured to record the data block evicted from the first cache; and caching the accessed first data block in the first cache. Such techniques can improve the cache hit rate, thereby improving the access performance of a system.

24 Claims, 5 Drawing Sheets

(56) References Cited

U.S. PATENT DOCUMENTS

| | | | |
|---|---|---|---|
| 2014/0281261 A1* | 9/2014 | Vera | G06F 11/0706 |
| | | | 711/135 |
| 2016/0203085 A1* | 7/2016 | Kranich | G06F 12/0238 |
| | | | 711/120 |
| 2016/0255169 A1* | 9/2016 | Kovvuri | H04L 67/5682 |
| | | | 709/219 |
| 2017/0357600 A1* | 12/2017 | Moon | G06F 12/0891 |
| 2018/0089091 A1* | 3/2018 | Akenine-Moller | |
| | | | G06F 12/0207 |
| 2018/0101476 A1* | 4/2018 | Drerup | G06F 12/0864 |
| 2018/0173636 A1* | 6/2018 | Reed | G06F 12/0891 |
| 2019/0087344 A1* | 3/2019 | Hijaz | G06F 12/128 |
| 2019/0236018 A1* | 8/2019 | Kass | G06F 12/0891 |
| 2020/0073825 A1 | 3/2020 | Zaydman | |
| 2020/0167281 A1* | 5/2020 | Flores | H04L 67/06 |
| 2020/0285592 A1* | 9/2020 | Ambroladze | G06F 12/128 |
| 2021/0056106 A1* | 2/2021 | Au | G06F 16/284 |
| 2021/0357328 A1* | 11/2021 | Abed | G06F 12/0811 |

\* cited by examiner

METHOD, ELECTRONIC DEVICE AND COMPUTER PROGRAM PRODUCT FOR MANAGING CACHE

CROSS-REFERENCE TO RELATED APPLICATION

This application claims priority to Chinese Patent Application No. CN202010170543.3, on file at the China National Intellectual Property Administration (CNIPA), having a filing date of Mar. 12, 2020, and having "METHOD, ELECTRONIC DEVICE AND COMPUTER PROGRAM PRODUCT FOR MANAGING CACHE" as a title, the contents and teachings of which are herein incorporated by reference in their entirety.

TECHNICAL FIELD

Embodiments of the present disclosure generally relate to the field of data storage, and in particular, to a method, an electronic device, and a computer program product for cache management.

BACKGROUND

In a storage system, frequently accessed data is usually stored in a cache to improve the efficiency of data access. When there is new data to be added to a cache but the cache is full, old data in the cache needs to be swapped out based on an eviction policy, so that the new data can be added to the cache. In conventional schemes, cache eviction policies are usually fixed, such as a policy based on the first-in-first-out (FIFO) algorithm which evicts data that first enters a cache, a policy based on the least recently used (LRU) algorithm which evicts data that has not been accessed for the longest time, or a policy based on the least frequently used (LFU) algorithm which evicts data that has been least frequently accessed over a period of time. These eviction policies are generally applied in different scenarios, and therefore, it is often difficult to achieve high cache utilization with a single eviction policy.

SUMMARY OF THE INVENTION

A method, an electronic device, and a computer program product for cache management are provided in embodiments of the present disclosure.

In a first aspect of the present disclosure, a method for cache management is provided. The method includes: accessing, according to a determination that a first data block to be accessed is missing in a first cache, the first data block from a storage device storing the first data block; selecting, according to a determination that the first cache is full and based on a plurality of parameters associated with a plurality of eviction policies, an eviction policy for evicting a data block in the first cache from the plurality of eviction policies, the plurality of parameters indicating corresponding possibilities that the plurality of eviction policies are selected; evicting a second data block in the first cache to a second cache based on the selected eviction policy, the second cache being configured to record the data block evicted from the first cache; and caching the accessed first data block in the first cache.

In a second aspect of the present disclosure, an electronic device is provided. The device includes a processor and a memory. The memory is coupled to the processor and stores instructions for execution by the processor. When executed by the processor, the instructions cause the device to perform actions including: accessing, according to a determination that a first data block to be accessed is missing in a first cache, the first data block from a storage device storing the first data block; selecting, according to a determination that the first cache is full and based on a plurality of parameters associated with a plurality of eviction policies, an eviction policy for evicting a data block in the first cache from the plurality of eviction policies, the plurality of parameters indicating corresponding possibilities that the plurality of eviction policies are selected; evicting a second data block in the first cache to a second cache based on the selected eviction policy, the second cache being configured to record the data block evicted from the first cache; and caching the accessed first data block in the first cache.

In a third aspect of the present disclosure, a computer program product is provided. The computer program product is tangibly stored in a non-transitory computer storage medium and includes machine-executable instructions. When executed by a device, the machine-executable instructions cause the device to perform the method described according to the first aspect above.

In a fourth aspect of the present disclosure, a computer-readable storage medium having a computer program stored thereon is provided, and when executed by a processor, the program implements the method described according to the first aspect above.

The summary is provided to introduce the choice of concepts in a simplified form, which will be further described in the Detailed Description below. The summary is neither intended to identify key features or necessary features of the present disclosure, nor intended to limit the scope of the present disclosure.

DESCRIPTION OF THE DRAWINGS

The above and other objectives, features, and advantages of the present disclosure will become more apparent based on more detailed description of example embodiments of the present disclosure with reference to the accompanying drawings. In the example embodiments of the present disclosure, identical reference numerals generally represent identical components.

In the drawings, identical or corresponding numerals represent identical or corresponding parts.

DETAILED DESCRIPTION

Figure 1:
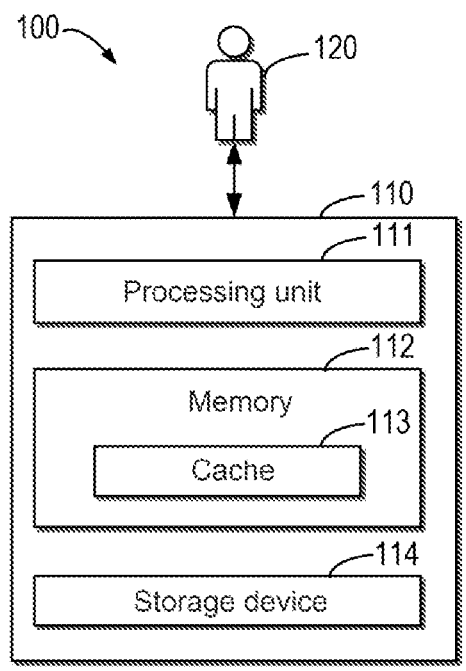
FIG. 1 is a block diagram of an example environment in which an embodiment of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Preferred embodiments of the present disclosure have been shown in the accompanying drawings. However, it should be appreciated that the present disclosure can be implemented in various forms and should not be limited by the embodiments described here. In contrast, the embodiments are provided to make the present disclosure more thorough and complete, and the scope of the present disclosure can be fully conveyed to those skilled in the art.

The term "include" and variants thereof used herein indicate open inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As described in the foregoing, in a storage system, frequently accessed data is usually stored in a cache to improve the efficiency of data access. When there is new data to be added to the cache but the cache is full, old data in the cache needs to be swapped out (e.g., evicted to another memory or storage device) based on an eviction policy, so that the new data can be added to the cache. In conventional schemes, cache eviction policies are usually fixed, such as a policy based on the FIFO algorithm, a policy based on the LRU algorithm, or a policy based on the LFU algorithm. These eviction policies are generally applied in different scenarios, and therefore, it is often difficult to achieve high cache utilization with a single eviction policy. For example, the LRU eviction policy may evict frequently accessed data.

Cache retention and eviction policies will greatly affect the cache hit rate, and further affect the data access performance of the system. A desirable retention and eviction policy should keep popular (frequently hit) data in the cache as long as possible, and meanwhile should also leave space for new data that may become popular. Therefore, a balance needs to be achieved between the two, and the balance between the two should also be maintained in a way that adapts to dynamic changes in workloads and IO modes.

A scheme for cache management is proposed in an embodiment of the present disclosure to solve the above problems and/or other potential problems. This scheme uses the method of reinforced online learning to dynamically select a policy most suitable for the current eviction operation from a plurality of eviction policies.

According to this scheme, the cache may be divided into a primary cache and a secondary cache, wherein the primary cache serves as a data cache, and the secondary cache is configured to record data evicted from the primary cache. When data needs to be evicted from the primary cache, an eviction policy for evicting data in the primary cache is selected from a plurality of eviction policies based on a plurality of parameters associated with the plurality of eviction policies, wherein the plurality of parameters indicate corresponding possibilities that the plurality of eviction policies are selected. The data evicted from the primary cache will be recorded in the secondary cache for dynamically adjusting the plurality of parameters associated with the plurality of eviction policies. When the data to be accessed is missing in the primary cache (that is, the cache is not hit) but exists in the secondary cache, the eviction policy for evicting the data from the primary cache to the secondary cache may be considered inappropriate. Therefore, the possibility that the eviction policy is selected in a subsequent eviction operation may be reduced by adjusting the plurality of parameters. As such, the embodiments of the present disclosure can achieve a dynamic balance between keeping popular (frequently hit) data in the cache as long as possible and leaving space for new data that may become popular, thereby improving the cache hit rate and the access performance of the system.

The embodiments of the present disclosure will be further described in detail below with reference to the accompanying drawings. FIG. 1 is a block diagram of example environment 100 in which an embodiment of the present disclosure can be implemented. It should be appreciated that the structure of environment 100 is described for illustrative purposes only and does not imply any limitation to the scope of the present disclosure. For example, the embodiment of the present disclosure may also be applied to an environment different from environment 100.

As shown in FIG. 1, environment 100 includes host 110, which may include processing unit 111, memory 112, cache 113, and storage device 114. Host 110 may be any physical computer, server, or the like. Storage device 114 may be any non-volatile storage medium currently known or to be developed in the future, such as a magnetic disk, an optical disk, a magnetic disk array, or the like. Examples of memory 112 include, but are not limited to, a random access memory (RAM), a read only memory (ROM), an erasable programmable read only memory (EPROM or flash memory), a static random access memory (SRAM), and the like. Cache 113 may cache frequently accessed data, thereby improving the access efficiency. In some embodiments, as shown in FIG. 1, cache 113 may be implemented in memory 112. Alternatively, in some other embodiments, cache 113 may be implemented using a storage medium having a higher access speed than storage device 114, such as a solid state disk (SSD), and cache 113 may be separated from memory 112.

Data in storage device 114 may be managed using a file system. According to the allocation unit size of the file system, each file in the file system can be divided into a plurality of fixed-size file system data blocks (referred to as "data blocks" for short). Therefore, processing unit 111 can manage the data in the cache in a unit of data blocks.

User 120 may initiate a data access request to host 110 for accessing a data block in storage device 114. When the data access request from user 120 is received, processing unit 111 may determine, by searching for an index structure of the cached data block, whether the data block to be accessed by user 120 exists in cache 113. If a result of the search indicates that the data block to be accessed by user 120 exists in cache 113, the data block can be accessed from cache 113. If the result of the search indicates that the data block to be accessed by user 120 is not cached in cache 113, the data block can be accessed from another memory or storage device 114. In addition, processing unit 111 may cache the accessed data blocks in cache 113 for improving the efficiency of subsequent access.

When the accessed data block is to be added to cache 113 but cache 113 is full, processing unit 111 may swap out an old data block in cache 113 based on an eviction policy, so that the new data block can be added to cache 113. In some embodiments, cache 113 may be divided into a primary cache (also referred to as "first cache" herein) and a secondary cache (also referred to as "second cache" herein). The primary cache is configured to cache accessed data blocks. When an accessed data block is to be added to the primary cache but the primary cache is full, processing unit 111 may select an eviction policy for evicting a data block in the primary cache from a plurality of eviction policies according to a plurality of parameters indicating corresponding possibilities that the plurality of eviction policies are selected. The data block evicted from the primary cache will be recorded in the secondary cache for dynamically adjusting the plurality of parameters associated with the plurality of eviction policies. When a data block to be accessed is missing in the primary cache (that is, the cache is not hit) but exists in the secondary cache, the eviction policy for evicting the data block from the primary cache to the secondary cache may be considered inappropriate. Therefore, the possibility that the eviction policy is selected in a subsequent eviction operation may be reduced by adjusting the plurality of parameters.

Figure 2:
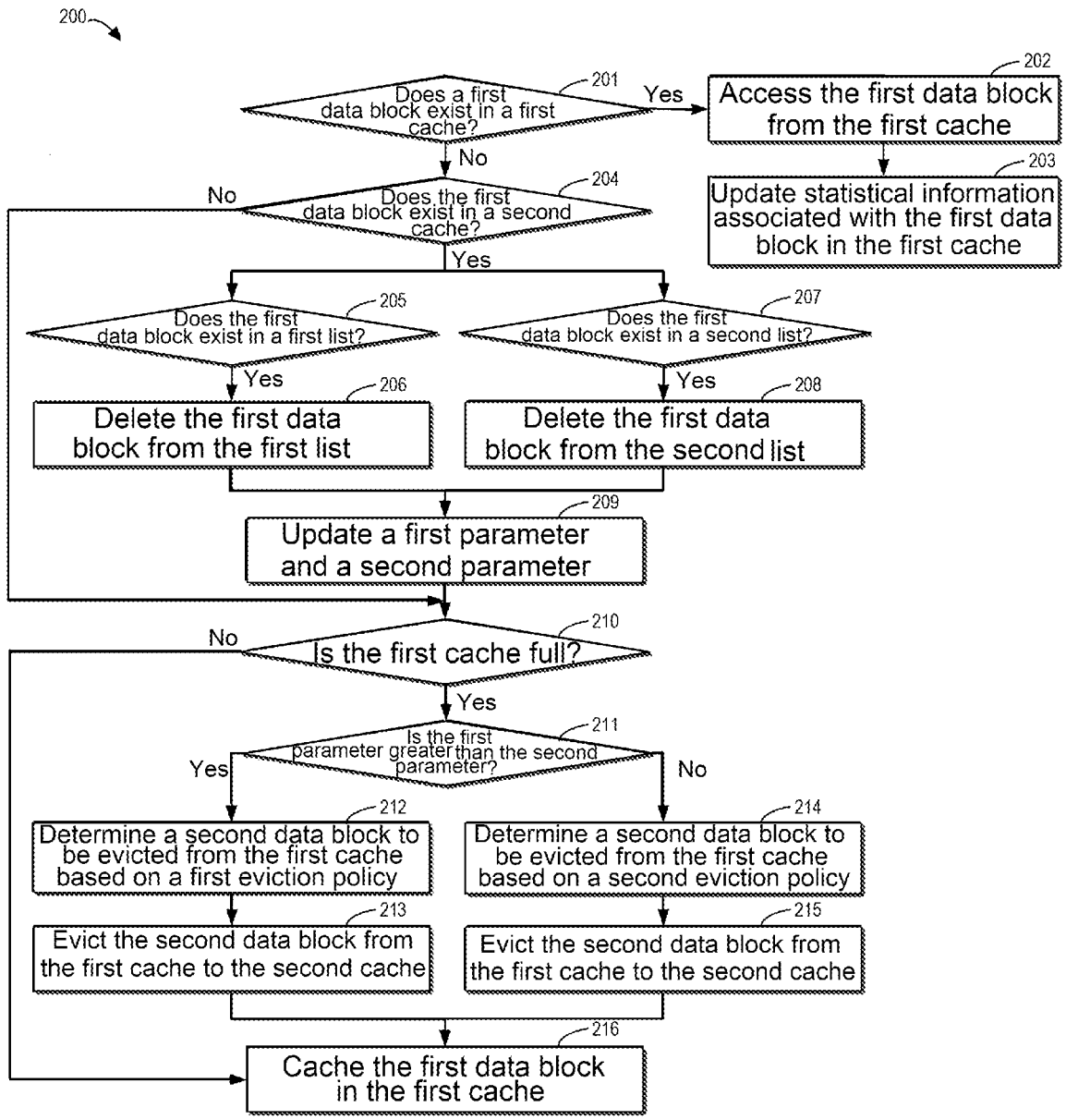
FIG. 2 is a flowchart of an example process for cache management according to an embodiment of the present disclosure.
Figure 3A:
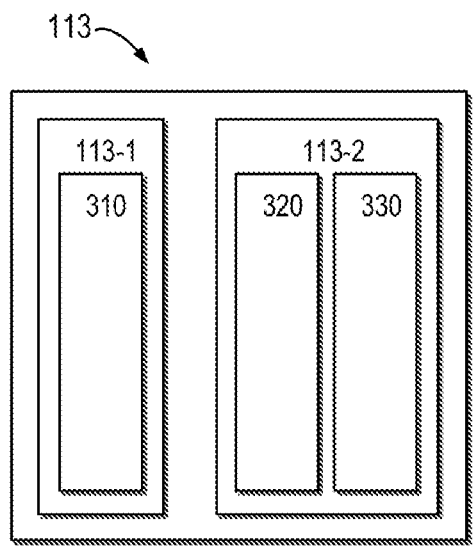
FIG. 3A is a schematic diagram of an example cache according to an embodiment of the present disclosure.

FIG. 2 is a flowchart of example process 200 for cache management according to an embodiment of the present disclosure. Process 200 may be implemented, for example, at host 110 (e.g., processing unit 111) as shown in FIG. 1. FIG. 3A is a schematic diagram of cache 113 according to an embodiment of the present disclosure. As shown in FIG. 3A, cache 113 may be divided into first cache 113-1 and second cache 113-2. Process 200 will be described in detail below with reference to FIG. 3A.

As shown in FIG. 2, when user 120 initiates a data access request directed to a first data block, in response to receiving the data access request from user 120, processing unit 111 may determine (201) whether the first data block exists in first cache 113-1. In some embodiments, processing unit 111 may determine whether the first data block exists in first cache 113-1 by searching for an index structure of the cached data. In some embodiments, processing unit 111 may generate a key for searching for an index structure based on an identifier of a file system to which the first data block is related and an identifier of the first data block in the file system. In some embodiments, data blocks in first cache 113-1 may be organized in a linked list. Processing unit 111 may determine whether the first data block exists in first cache 113-1 by traversing the linked list. Alternatively, a hash table may be used to perform secondary indexing on the linked list to speed up the search efficiency.

As shown in FIG. 2, if the first data block exists in first cache 113-1, processing unit 111 may access (202) the first data block from first cache 113-1, and return the accessed first data block to user 120. Then, processing unit 111 may update (203) statistical information related to the first data block in first cache 113-1.

In some embodiments, data blocks in first cache 113-1 are organized in an LRU linked list, as shown by linked list 310 in FIG. 3A. That is, in linked list 310, a data block closest to the tail of the linked list is the least recently accessed. When the first data block in first cache 113-1 is accessed, the first data block may be deleted from LRU linked list 310 and re-inserted into the head of LRU linked list 310. Additionally, each data block in first cache 113-1 also has a corresponding access count. The access count is statistical information related to the LFU eviction policy. When the first data block in first cache 113-1 is accessed, the corresponding access count needs to be incremented. In addition, statistical information may also include other global statistical information, such as the total number of cache hits.

As shown in FIG. 2, if the first data block does not exist in first cache 113-1, processing unit 111 may determine (204) whether the first data block exists in second cache 113-2. In some embodiments, second cache 113-2 may include a plurality of lists for respectively recording data blocks that are evicted from first cache 113-1 based on different eviction policies. For the purpose of illustration rather than limitation, it is assumed in the following that the plurality of eviction policies that can be selected include an eviction policy based on the LRU algorithm (also referred to as "first eviction policy") and an eviction policy based on the LFU algorithm (also referred to as "second eviction policy").

As shown in FIG. 3A, for example, second cache 113-2 may include list 320 (also referred to as "first list") and list 330 (also referred to as "second list"), wherein list 320 is configured to record data blocks evicted from first cache 113-1 based on the LRU eviction policy (also referred to as "first eviction policy"), while list 330 is configured to record data blocks evicted from first cache 113-1 based on the LFU eviction policy (also referred to as "second eviction policy"). As shown in FIG. 2, processing unit 111 may determine (205) whether the first data block exists in list 320. If the first data block exists in list 320, processing unit 111 may access the first data block from list 320 and return the accessed first data block to user 120. Processing unit 111 may then delete (206) the first data block from list 320. If the first data block exists in list 330, processing unit 111 may access the first data block from list 330 and return the accessed first data block to user 120. Processing unit 111 may then delete (207) the first data block from list 330. As will be further described below, the deleted first data block will be re-added to first cache 113-1 to facilitate subsequent access.

In response to that the first data block is deleted from second cache 113-2, the plurality of parameters indicating the possibilities that the plurality of eviction policies are selected may be updated. As shown in FIG. 2, a first parameter associated with the first eviction policy and a second parameter associated with the second eviction policy may be updated (209).

In some embodiments, initial values of the first parameter and the second parameter may be the same. Alternatively, the initial value of the first parameter and the initial value of the second parameter may be determined based on some prior information.

In some embodiments, if the first data block is deleted from list 320, this indicates that the first data block is evicted from first cache 113-1 based on the first eviction policy, and the second parameter associated with the second eviction policy can be increased to increase the possibility that the second eviction policy is selected subsequently, as shown in the following formula (1):

$$w_{LFU} = w_{LFU} e^{\lambda \cdot r} \qquad (1)$$

wherein $w_{LFU}$ represents the parameter (i.e., the second parameter) indicating the possibility that the LFU eviction policy (i.e., the second eviction policy) is selected. λ represents a learning rate, which may be a fixed value (e.g., 0.45) or a configurable value. r represents the reward for the second eviction policy. For example, $r=d^t$, wherein t represents the total duration of the first data block in list 320, and d represents a discount rate, which may be a value related to the size of cache 113 (for example, $0.005^{1/N}$, wherein N represents the size of cache 113).

In some embodiments, if the first data block is deleted from list 330, this indicates that the first data block is evicted from first cache 113-1 based on the second eviction policy, and the first parameter associated with the first eviction policy can be increased to increase the possibility that the first eviction policy is selected subsequently, as shown in the following formula (2):

$$w_{LRU}=w_{LRU}e^{\lambda \cdot r} \qquad (2)$$

Wherein $w_{LRU}$ represents the parameter (i.e., the first parameter) indicating the possibility that the LRU eviction policy (i.e., the first eviction policy) is selected. represents a learning rate, which may be a fixed value (e.g., 0.45) or a configurable value. r represents the reward for the first eviction policy. For example, $r=d^t$, wherein t represents the total duration of the first data block in list 330, and d represents a discount rate, which may be a value related to the size of cache 113 (for example, $0.005^{1/N}$, wherein N represents the size of cache 113).

Additionally, in some embodiments, the first parameter or the second parameter updated based on formula (1) or formula (2) may be further normalized, as shown in formula (3):

$$w_{LRU}=w_{LRU}/(w_{LRU}+w_{LFU})$$

$$w_{LFU}=1-w_{LRU} \qquad (3)$$

As shown in FIG. 2, in response to that parameters associated with different eviction policies are updated or in response to that the first data block does not exist in second cache 113-2, processing unit 111 may determine (210) whether first cache 113-1 is full. If first cache 113-1 is not full, processing unit 111 may add (216) the accessed first data block to first cache 113-1 for improving the efficiency of subsequent access. If first cache 113-1 is full, in order to add the first data block to first cache 113-1, processing unit 111 may first evict at least one data block from first cache 113-1. In some embodiments, processing unit 111 may determine, based on parameters associated with different eviction policies, which eviction policy will be used to evict the data block in first cache 113-1.

As shown in FIG. 2, processing unit 111 may determine (211) whether the first parameter is $w_{LRU}$ greater than the second parameter $w_{LFU}$. If the first parameter $w_{LRU}$ is greater than the second parameter $w_{LFU}$, the first eviction policy will be selected. In this case, processing unit 111 may select (212) the least recently accessed data block from first cache 113-1 as the data block to be evicted (also referred to as "second data block"). Processing unit 111 may evict (213) the selected second data block from first cache 113-1 to second cache 113-2.

Figure 3B:
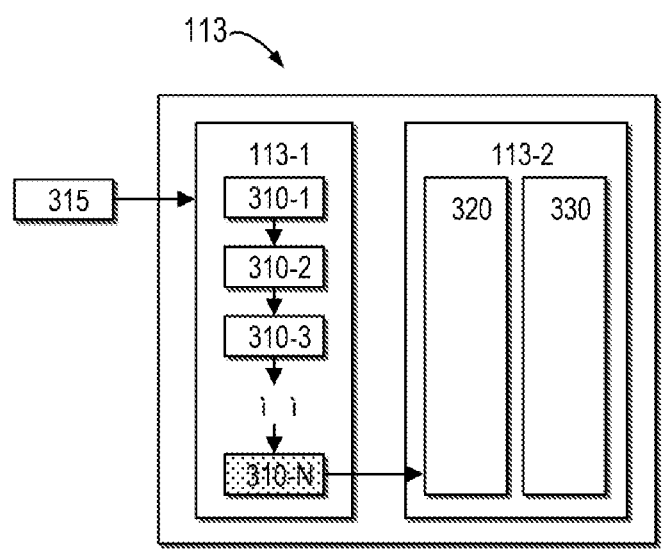
FIG. 3B is a schematic diagram of evicting a data block in a first cache to a second cache according to an embodiment of the present disclosure.

FIG. 3B is a schematic diagram of evicting a data block in first cache 113-1 to second cache 113-2 according to an embodiment of the present disclosure. In the example shown in FIG. 3B, it is assumed that first data block 315 will be added to first cache 113-1 but first cache 113-1 is full, and it is assumed that $w_{LRU}$ is greater than $w_{LFU}$, so the LRU-based eviction policy will be selected. As shown in FIG. 3B, data blocks 310-1, 310-2, . . . 310-N cached in first cache 113-1 can be organized in an LRU linked list, wherein data block 310-N is located at the linked list tail of the LRU linked list, that is, it is the least recently accessed data block. Therefore, data block 310-N will be evicted to list 320 in second cache 113-2.

Referring back to FIG. 2, if the first parameter $w_{LRU}$ is less than or equal to the second parameter $w_{LRU}$, the second eviction policy will be selected. In this case, processing unit 111 may select (214) the least frequently accessed data block from first cache 113-1 as the data block to be evicted (also referred to as "second data block"). For example, processing unit 111 may select a data block having a minimum access count in a specific time period as the second data block. Processing unit 111 may evict (215) the selected second data block from first cache 113-1 to second cache 113-2.

After processing unit 111 evicts the second data block in first cache 113-1 to second cache 113-2, there is available space in first cache 113-1 for caching the first data block. Therefore, processing unit 111 may add (216) the first data block to first cache 113-1.

As such, the embodiment of the present disclosure can achieve a dynamic balance between keeping popular (frequently hit) data in the cache as long as possible and leaving space for new data that may become popular, thereby improving the cache hit rate and the access performance of the system.

Figure 4:
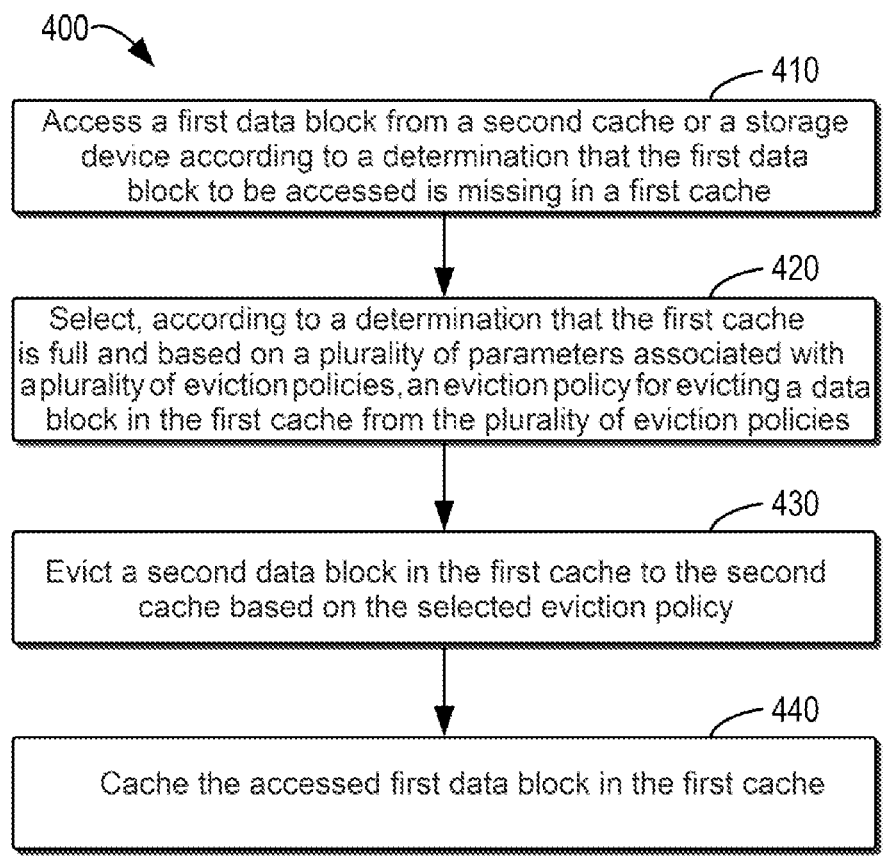
FIG. 4 is a flowchart of an example method for cache management according to an embodiment of the present disclosure.

FIG. 4 is a flowchart of example method 400 for cache management according to an embodiment of the present disclosure. For example, method 400 may be performed at host 110 as shown in FIG. 1. Process 200 shown in FIG. 2 may be considered as an example implementation of method 400. It should also be appreciated that method 400 may also include additional blocks not shown and/or may omit the shown blocks, and the scope of the present disclosure is not limited in this aspect.

At block 410, host 110 accesses, according to a determination that a first data block to be accessed is missing in first cache 113-1, the first data block from a storage device storing the first data block.

In some embodiments, host 110 accesses the first data block from second cache 113-2 according to a determination that the first data block exists in second cache 113-2. Alternatively or additionally, host 110 accesses, according to a determination that the first data block is missing in second cache 113-2, the first data block from storage device 114 storing the first data block.

In some embodiments, host 110 deletes the first data block from second cache 113-2 according to a determination that the first data block exists in second cache 113-2. Host 110 updates, according to an eviction policy for evicting the first data block to second cache 113-2, a plurality of parameters indicating corresponding possibilities that a plurality of eviction policies are selected.

In some embodiments, second cache 113-2 is configured to record data blocks that are evicted from first cache 113-1. Second cache 113-2 includes a plurality of lists, and each list includes data blocks that are evicted from first cache 113-1 based on a corresponding eviction policy in the plurality of eviction policies. Host 110 determines a list in which the first data block is located from the plurality of lists, and then deletes the first data block from the determined list.

In some embodiments, the plurality of eviction policies include a first eviction policy and a second eviction policy, and the plurality of parameters include a first parameter associated with the first eviction policy and a second parameter associated with the second eviction policy. In some embodiments, host 110 updates the first parameter and the second parameter according to a determination that the first data block is evicted to second cache 113-2 based on the first eviction policy, to increase the possibility that the second eviction policy is selected. Additionally or alternatively, host 110 updates the first parameter and the second parameter according to a determination that the first data block is evicted to second cache 113-2 based on the second eviction policy, to increase the possibility that the first eviction policy is selected.

In some embodiments, host 110 caches the first data block in first cache 113-1 according to a determination that the first data block is accessed from the storage device and first cache 113-1 is not full.

At block 420, host 110 selects, according to a determination that first cache 113-1 is full and based on the plurality of parameters associated with the plurality of eviction policies, an eviction policy for evicting a data block in first cache 113-1 from the plurality of eviction policies. In some embodiments, host 110 determines a maximum parameter in the plurality of parameters, and then selects an eviction policy corresponding to the maximum parameter from the plurality of eviction policies.

At block 430, host 110 evicts the second data block in first cache 113-1 to second cache 113-2 based on the selected eviction policy.

In some embodiments, the plurality of eviction policies include: a first eviction policy based on the LRU algorithm and a second eviction policy based on the LFU algorithm.

In some embodiments, second cache 113-2 includes first list 320 configured to cache data blocks that are evicted from first cache 113-1 based on the first eviction policy. Host 110 determines, according to a determination that the first eviction policy is selected, a least recently accessed data block from first cache 113-1 as the second data block, and evicts the second data block from first cache 113-1 to first list 320.

In some embodiments, second cache 113-2 includes second list 330 configured to cache data blocks that are evicted from first cache 113-1 based on the second eviction policy. Host 110 determines, according to a determination that the first eviction policy is selected, a least frequently accessed data block from first cache 113-1 as the second data block, and evicts the second data block from first cache 113-1 to second list 330.

Additionally or alternatively, in some embodiments, host 110 accesses, according to a determination that the first data block to be accessed exists in first cache 113-1, the first data block from first cache 113-1.

Figure 5:
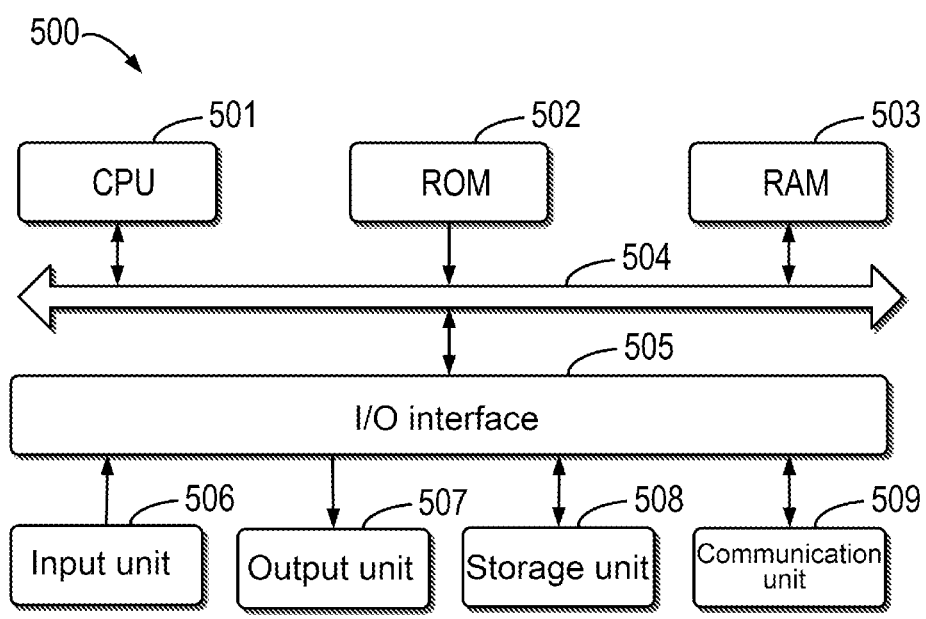
FIG. 5 is a schematic block diagram of an example electronic device that can be used to implement an embodiment of the present disclosure.

FIG. 5 is a schematic block diagram of example electronic device 500 that can be used to implement an embodiment of the present disclosure. For example, host 110 as shown in FIG. 1 can be implemented by device 500. As shown in FIG. 5, device 500 includes central processing unit (CPU) 501 that can perform various appropriate actions and processing according to computer program instructions stored in read-only memory (ROM) 502 or computer program instructions loaded from storage unit 508 to random access memory (RAM) 503. Various programs and data required for the operation of device 500 can also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices over a computer network such as the Internet and/or various telecommunication networks.

The various processes or processing described above, e.g., process 200 and/or method 400, may be performed by processing unit 501. For example, in some embodiments, process 200 and/or method 400 can be implemented as a computer software program that is tangibly included in a machine-readable medium, such as storage unit 508. In some embodiments, some or all of the computer program can be loaded and/or installed onto device 500 via ROM 502 and/or communication unit 509. When the computer program is loaded into RAM 503 and executed by CPU 501, one or more actions of process 200 and/or method 400 described above may be implemented.

The present disclosure may be a method, a device, a system, and/or a computer program product. The computer program product may include a computer-readable storage medium having computer-readable program instructions for performing various aspects of the present disclosure loaded thereon.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or a protruding structure within a groove on which instructions are stored, and any appropriate combination of the above. The computer-readable storage medium as used here is not explained as transient signals per se, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object-oriented programming languages, such as Smalltalk and C++, as well as conventional procedural programming languages, such as the "C" language or similar programming languages. The computer-readable program instructions may be executed completely on a user's computer, executed partially on a user's computer, executed as a separate software package, executed partially on a user's computer and partially on a remote computer, or executed completely on a remote computer or a server. In the case where a remote computer is involved, the remote computer can be connected to a user's computer over any kind of networks, including a local area network (LAN) or a wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), can be customized by utilizing state information of computer-readable program instructions. The electronic circuit can execute the computer-readable program instructions to implement various aspects of the present disclosure.

Various aspects of the present disclosure are described here with reference to flowcharts and/or block diagrams of the method, device (system), and computer program product according to the embodiments of the present disclosure. It should be appreciated that each block in the flowcharts and/or block diagrams and a combination of blocks in the flowcharts and/or block diagrams can be implemented by computer-readable program instructions.

The computer-readable program instructions can be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions enable a computer, a programmable data processing apparatus, and/or another device to work in a specific manner, such that the computer-readable medium storing the instructions includes an article of manufacture that includes instructions for implementing various aspects of functions/actions specified in one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer-implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to a plurality of embodiments of the present disclosure. In this regard, each block in the flowcharts or block diagrams can represent a module, a program segment, or a portion of instructions that includes one or more executable instructions for implementing specified logical functions. In some alternative implementations, functions labeled in the blocks may occur in an order different from those labeled in the accompanying drawings. For example, two successive blocks may actually be performed basically in parallel, or they can be performed in an opposite order sometimes, depending on the functions involved. It also should be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above. The foregoing description is illustrative rather than exhaustive, and is not limited to the disclosed various embodiments. Numerous modifications and changes are apparent to those of ordinary skill in the art without departing from the scope and spirit of the illustrated various embodiments. The selection of terms as used herein is intended to best explain the principles and practical applications of the various embodiments, or the technical improvement to technologies on the market, or to enable other persons of ordinary skill in the art to understand the embodiments disclosed herein.

The invention claimed is:

1. A method for cache management, comprising:
   accessing, according to a determination that a first data block to be accessed is missing in a first cache, the first data block from a storage device storing the first data block;
   selecting, according to a determination that the first cache is full and based on a plurality of parameters having a one-to-one association with a plurality of eviction policies, an eviction policy for evicting a data block in the first cache from the plurality of eviction policies, the plurality of parameters indicating corresponding possibilities that the plurality of eviction policies are selected;
   evicting a second data block in the first cache to a second cache based on the selected eviction policy, the second cache being configured to record the data block evicted from the first cache; and
   caching the accessed first data block in the first cache.

2. The method of claim 1, wherein accessing the first data block from the storage device storing the first data block comprises:
   accessing, according to a determination that the first data block exists in the second cache, the first data block from the second cache; and
   accessing, according to a determination that the first data block is missing in the second cache, the first data block from the storage device storing the first data block.

3. The method of claim 1, further comprising:
   deleting the first data block from the second cache according to a determination that the first data block exists in the second cache; and
   updating the plurality of parameters according to an eviction policy for evicting the first data block to the second cache.

4. The method of claim 3, wherein the second cache comprises a plurality of lists, each of the plurality of lists comprising data blocks evicted from the first cache based on a corresponding eviction policy in the plurality of eviction policies, and deleting the first data block from the second cache comprises:

determining, from the plurality of lists, a list in which the first data block is located; and deleting the first data block from the determined list.

5. The method of claim 3, wherein the plurality of eviction policies comprise a first eviction policy and a second eviction policy, and the plurality of parameters comprise a first parameter associated with the first eviction policy and a second parameter associated with the second eviction policy, and updating the plurality of parameters comprises:

updating the first parameter and the second parameter according to a determination that the first data block is evicted to the second cache based on the first eviction policy, to increase the possibility that the second eviction policy is selected; and updating the first parameter and the second parameter according to a determination that the first data block is evicted to the second cache based on the second eviction policy, to increase the possibility that the first eviction policy is selected.

6. The method of claim 1, wherein selecting the eviction policy from the plurality of eviction policies comprises:

determining a maximum parameter in the plurality of parameters; and selecting an eviction policy corresponding to the maximum parameter in the plurality of eviction policies as the eviction policy for evicting the second data block.

7. The method of claim 1, wherein the plurality of eviction policies comprise:

a first eviction policy based on the least recently used (LRU) algorithm; and a second eviction policy based on the least frequently used (LFU) algorithm.

8. The method of claim 7, wherein the second cache comprises a first list for caching data blocks evicted from the first cache based on the first eviction policy, and evicting the second data block from the first cache to the second cache comprises:

determining, according to a determination that the first eviction policy is selected, a least recently accessed data block from the first cache as the second data block; and evicting the second data block from the first cache to the first list.

9. The method of claim 7, wherein the second cache comprises a second list for caching data blocks evicted from the first cache based on the second eviction policy, and evicting the second data block from the first cache to the second cache comprises:

determining, according to a determination that the second eviction policy is selected, a least frequently accessed data block from the first cache as the second data block; and evicting the second data block from the first cache to the second list.

10. The method of claim 1, further comprising:
accessing the first data block from the first cache according to a determination that the first data block to be accessed exists in the first cache.

11. The method of claim 1, further comprising:
caching the first data block in the first cache according to a determination that the first data block is accessed from the storage device and the first cache is not full.

12. An electronic device, comprising:
a processor;
a memory coupled to the processor and storing instructions for execution by the processor, wherein when executed by the processor, the instructions cause the device to perform actions comprising:

accessing, according to a determination that a first data block to be accessed is missing in a first cache, the first data block from a storage device storing the first data block;

selecting, according to a determination that the first cache is full and based on a plurality of parameters having a one-to-one association with a plurality of eviction policies, an eviction policy for evicting a data block in the first cache from the plurality of eviction policies, the plurality of parameters indicating corresponding possibilities that the plurality of eviction policies are selected;

evicting a second data block in the first cache to a second cache based on the selected eviction policy, the second cache being configured to record the data block evicted from the first cache; and caching the accessed first data block in the first cache.

13. The device of claim 12, wherein accessing the first data block from the storage device storing the first data block comprises:

accessing, according to a determination that the first data block exists in the second cache, the first data block from the second cache; and accessing, according to a determination that the first data block is missing in the second cache, the first data block from the storage device storing the first data block.

14. The device of claim 12, wherein the actions further comprise:

deleting the first data block from the second cache according to a determination that the first data block exists in the second cache; and updating the plurality of parameters according to an eviction policy for evicting the first data block to the second cache.

15. The device of claim 14, wherein the second cache comprises a plurality of lists, each of the plurality of lists comprising data blocks evicted from the first cache based on a corresponding eviction policy in the plurality of eviction policies, and deleting the first data block from the second cache comprises:

determining, from the plurality of lists, a list in which the first data block is located; and deleting the first data block from the determined list.

16. The device of claim 14, wherein the plurality of eviction policies comprise a first eviction policy and a second eviction policy, and the plurality of parameters comprise a first parameter associated with the first eviction policy and a second parameter associated with the second eviction policy, and updating the plurality of parameters comprises:

updating the first parameter and the second parameter according to a determination that the first data block is evicted to the second cache based on the first eviction policy, to increase the possibility that the second eviction policy is selected; and updating the first parameter and the second parameter according to a determination that the first data block is evicted to the second cache based on the second eviction policy, to increase the possibility that the first eviction policy is selected.

17. The device of claim 12, wherein selecting the eviction policy from the plurality of eviction policies comprises:

determining a maximum parameter in the plurality of parameters; and selecting an eviction policy corresponding to the maximum parameter in the plurality of eviction policies as the eviction policy for evicting the second data block.

18. The device of claim 12, wherein the plurality of eviction policies comprise:
   a first eviction policy based on the least recently used (LRU) algorithm; and
   a second eviction policy based on the least frequently used (LFU) algorithm.

19. The device of claim 18, wherein the second cache comprises a first list for caching data blocks evicted from the first cache based on the first eviction policy, and evicting the second data block from the first cache to the second cache comprises:
   determining, according to a determination that the first eviction policy is selected, a least recently accessed data block from the first cache as the second data block; and
   evicting the second data block from the first cache to the first list.

20. The device of claim 18, wherein the second cache comprises a second list for caching data blocks evicted from the first cache based on the second eviction policy, and evicting the second data block from the first cache to the second cache comprises:
   determining, according to a determination that the second eviction policy is selected, a least frequently accessed data block from the first cache as the second data block; and
   evicting the second data block from the first cache to the second list.

21. The device of claim 12, wherein the actions further comprise:
   accessing the first data block from the first cache according to a determination that the first data block to be accessed exists in the first cache.

22. The device of claim 12, wherein the actions further comprise:
   caching the first data block in the first cache according to a determination that the first data block is accessed from the storage device and the first cache is not full.

23. A computer program product having a non-transitory computer readable medium which stores a set of instructions to perform cache management; the set of instructions, when carried out by computerized circuitry, causing the computerized circuitry to perform a method of:
   accessing, according to a determination that a first data block to be accessed is missing in a first cache, the first data block from a storage device storing the first data block;
   selecting, according to a determination that the first cache is full and based on a plurality of parameters having a one-to-one association with a plurality of eviction policies, an eviction policy for evicting a data block in the first cache from the plurality of eviction policies, the plurality of parameters indicating corresponding possibilities that the plurality of eviction policies are selected;
   evicting a second data block in the first cache to a second cache based on the selected eviction policy, the second cache being configured to record the data block evicted from the first cache; and
   caching the accessed first data block in the first cache.

24. The method of claim 1, further comprising:
   in response to accessing a data block from the second cache, adjusting a parameter to decrease a corresponding possibility that the selected eviction policy is selected.

* * * * *